US012682021B2

(12) United States Patent
Kim et al.

(10) Patent No.: US 12,682,021 B2
(45) Date of Patent: Jul. 14, 2026

(54) DATA COLLECTION APPARATUS AND METHOD FOR MACHINE LEARNING

(71) Applicant: Soojin Kim, Seoul (KR)

(72) Inventors: Soojin Kim, Seoul (KR); Sung Min Kim, Seoul (KR)

(73) Assignee: Soojin Kim, Seoul (KR)

( * ) Notice: Subject to any disclaimer, the term of this patent is extended or adjusted under 35 U.S.C. 154(b) by 30 days.

(21) Appl. No.: 18/677,088

(22) Filed: May 29, 2024

(65) Prior Publication Data

US 2024/0403393 A1      Dec. 5, 2024

(30) Foreign Application Priority Data

May 30, 2023    (KR) ........................ 10-2023-0068992

(51) Int. Cl.
*G06F 21/62* (2013.01)
*G06F 21/10* (2013.01)
*G06N 20/00* (2019.01)
*G06Q 20/40* (2012.01)

(52) U.S. Cl.
CPC ........ *G06F 21/108* (2023.08); *G06F 21/6245* (2013.01); *G06F 2221/2101* (2013.01); *G06F 2221/2135* (2013.01); *G06N 20/00* (2019.01); *G06Q 20/4018* (2013.01)

(58) Field of Classification Search
CPC ... G06F 21/108; G06F 21/6245; G16H 50/70; G16H 10/20; G06N 20/00; G06Q 20/4018
See application file for complete search history.

(56) References Cited

U.S. PATENT DOCUMENTS

| | | | |
|---|---|---|---|
| 9,268,849 B2 * | 2/2016 | Siedlecki | .............. G06F 16/212 |
| 11,567,650 B1 * | 1/2023 | Crowley | .............. G06F 3/0482 |
| 11,748,759 B1 * | 9/2023 | Sardari | .................. G06Q 20/20 |
| | | | 705/44 |
| 2011/0288891 A1 * | 11/2011 | Zaid | ....................... G06Q 40/08 |
| | | | 705/26.4 |
| 2013/0185191 A1 * | 7/2013 | Ganor | .................... G06Q 40/02 |
| | | | 705/39 |
| 2015/0032624 A1 * | 1/2015 | Claridge | ............ G06Q 20/4016 |
| | | | 705/44 |
| 2016/0055576 A1 * | 2/2016 | Reddy | ................ G06Q 30/0645 |
| | | | 705/80 |
| 2017/0264640 A1 * | 9/2017 | Narayanaswamy | ......................... G06F 21/6209 |

(Continued)

*Primary Examiner* — William R Korzuch
*Assistant Examiner* — Aditya Sriram
(74) *Attorney, Agent, or Firm* — Knobbe, Martens, Olson & Bear, LLP

(57) ABSTRACT

A data collection method for machine learning is proposed. The method may include accessing machine learning data stored in a device, and requesting an approval for a use of the machine learning data from an entity which has generated the machine learning data. The method may also include determining whether to transmit the machine learning data to a database for learning or a temporary database based on a result of the approval and a similarity between the machine learning data and previously-transmitted-machine learning data. The previously-transmitted-machine learning data may include a first machine learning data which has previously transmitted to the database for learning and a second machine learning data which has previously transmitted to the temporary database.

5 Claims, 4 Drawing Sheets

(56)                    References Cited

U.S. PATENT DOCUMENTS

| 2020/0118137 A1* | 4/2020 | Sood ...................... G06Q 10/00 |
| 2020/0380531 A1* | 12/2020 | Vaidya ................. G06N 3/0442 |
| 2021/0224258 A1* | 7/2021 | Faruquie ............. G06N 3/0985 |
| 2023/0013479 A1* | 1/2023 | Sankaranarayanan ...................... |
| | | G06N 20/00 |
| 2024/0220663 A1* | 7/2024 | Ezrielev ................. G06F 21/64 |

* cited by examiner

START

ACCESS DATA STORED IN A DEVICE     ~S100

REQUEST APPROVAL FOR THE USE OF THE DATA     ~S200

DETERMINE WHETHER TO TRANSMIT DATA TO
THE DATABASE FOR LEARNING ACCORDING TO
THE RESULT OF THE APPROVAL ENTERED     ~S300

DATA COLLECTION APPARATUS AND METHOD FOR MACHINE LEARNING

CROSS-REFERENCE TO RELATED APPLICATION

This application claims priority to Korean Patent Application No. 10-2023-0068992, filed on May 30, 2023, the entirety of which is incorporated herein by reference for all purposes.

TECHNICAL FIELD

The present disclosure relates to a data collection apparatus and method for machine learning.

BACKGROUND

Machine learning, which plays an important role in the field of artificial intelligence, is a method that involves learning from data to build artificial intelligence models and making predictions on new data.

SUMMARY

One aspect is an apparatus and a method for preventing machine learning data from being disclosed to unspecified individuals regardless of the intention of an entity which has generated the machine learning data storing the data by obtaining approval for using the data to the entity which has generated the machine learning data before the machine learning data is used for machine learning.

However, aspects of the present disclosure are not limited to those disclosed herein, and other aspects that are not mentioned may be clearly understood by those of ordinary skill in the art to which the present disclosure belongs from the following description.

Another aspect is a data collection method for machine learning to be performed by a data collection apparatus, the method comprising accessing machine learning data stored in a device, requesting approval for a use of the machine learning data from an entity which has generated the machine learning data, and determining whether to transmit the machine learning data to a database for learning or a temporary database based on a result of the approval and a similarity between the machine learning data and previously-transmitted-machine learning data, wherein the previously-transmitted-machine learning data includes a first machine learning data which has previously transmitted to the database for learning and a second machine learning data which has previously transmitted to the temporary database, wherein, in the determining of whether to transmit the machine learning data, in case that the similarity between the machine learning data and at least part of the first machine learning data or the second machine learning data is less than a predetermined value, the machine learning data is transmitted to the temporary database; and when the approval for the use of machine learning data is inputted, the machine learning data is transmitted from the temporary database to the database for learning.

In the determining of whether to transmit the machine learning data, in case that the machine learning data is identical to at least part of the first machine learning data or the second machine learning data, the machine learning data may not be transmitted.

In the determining of whether to transmit the machine learning data, in case that the similarity between the machine learning data and at least part of the second machine learning data is greater than or equal to a predetermined value, and a second approval for the use of the second machine learning data is inputted, the machine learning data may be directly transmitted to the database for learning without the approval for the use of the machine learning data.

In the determining of whether to transmit the machine learning data, in case that the similarity between the machine learning data and at least part of the first machine learning data is greater than or equal to a predetermined value, the machine learning data may be directly transmitted to the database for learning without the approval for the use of the machine learning data.

In the determining of whether to transmit the machine learning data, in case that disapproval of the use of the machine learning data is inputted, or in case that the approval for the use of the machine learning data is not inputted for more than a predetermined time, the machine learning data may be deleted from the temporary database. The result of the approval for the use of the machine learning data may be inputted in advance through the device before the requesting the approval for the use of the machine learning data. In case that the result of the approval inputted in advance is approval for the use of the machine learning data, the machine learning data may be transmitted to the database for learning without separate approval for the use of the machine learning data, and in case that the result of the approval inputted in advance is disapproval of the use of the machine learning data, the machine learning data may not be transmitted to the database for learning.

The method may further include transmitting an interface through which a result of the approval for the use of the machine learning data is inputted. The transmitting the interface includes retransmitting the interface for a predetermined number of times in case that the result of the approval is not inputted for more than a predetermined time, and in case that the interface is retransmitted for more than the predetermined number of times, the determining of whether to transmit the machine learning data to the database for learning may not transmit the machine learning data to the database for learning.

The result of the approval may be inputted again after the result of the approval is inputted.

After a first input approving the use of machine learning data is inputted, in case that a second input disapproving the use of the machine learning data is inputted again, the machine learning data may not be transmitted to the database for learning from the moment the second input is re-inputted and, wherein, after a third input disapproving the use of machine learning data is inputted, in case that a fourth input approving the use of the machine learning data is inputted again, the machine learning data may be transmitted to the database for learning from the moment the fourth input is re-inputted.

The requesting of approval for the use of the machine learning data may include generating log data in case that the machine learning data stored in the device is accessed and transmitting the log data to an entity which has generated the machine learning data.

The log data may include a time at which the machine learning data has been accessed, an access method, IP information or other unique code, the number of times the machine learning data has been collected, or the number of times machine learning has been performed using the machine learning data.

The transmitting of the machine learning data to the temporary database may encrypt the machine learning data and transmits the encrypted machine learning data to the temporary database.

Another aspect is a data collection apparatus, the apparatus comprising a memory including computer-executable commands and a processor performing a data collection method for machine learning by executing the commands, the method comprises accessing machine learning data stored in a device, requesting approval for a use of the machine learning data from an entity which has generated the machine learning data and determining whether to transmit the machine learning data to a database for learning or a temporary database based on a result of the approval and a similarity between the machine learning data and previously-transmitted-machine learning data, wherein the previously-transmitted-machine learning data includes a first machine learning data which has previously transmitted to the database for learning and a second machine learning data which has previously transmitted to the temporary database, wherein, in the determining of whether to transmit the machine learning data, in case that the similarity between the machine learning data and at least part of the first machine learning data or the second machine learning data is less than a predetermined value, the machine learning data is transmitted to the temporary database and when the approval for the use of machine learning data is inputted, the machine learning data is transmitted from the temporary database to the database for learning.

Another aspect is a non-transitory computer-readable storage medium storing computer-executable commands, the computer-executable commands, if being executed by a processor, controlling the processor to perform a data collection method for machine learning, the method comprising accessing machine learning data stored in a device, requesting approval for a use of the machine learning data from an entity which has generated the machine learning data and determining whether to transmit the machine learning data to a database for learning or a temporary database based on a result of the approval and a similarity between the machine learning data and previously-transmitted-machine learning data, wherein the previously-transmitted-machine learning data includes a first machine learning data which has previously transmitted to the database for learning and a second machine learning data which has previously transmitted to the temporary database, wherein, in the determining of whether to transmit the machine learning data, in case that similarity between the machine learning data and at least part of the first machine learning data or the second machine learning data is less than a predetermined value, the machine learning data is transmitted to the temporary database; and when the approval for the use of machine learning data is inputted, the machine learning data is transmitted from the temporary database to the database for learning.

According to an embodiment of the present disclosure, by obtaining approval for using machine learning data from an entity which has generated the machine learning data storing the data before the data is used for machine learning, the data may be prevented from being disclosed to unspecified individuals regardless of the intention of the entity which has generated the machine learning data.

An entity which has generated the machine learning data may identify individuals who use machine learning data owned by the entity, assert the entity's rights regarding using the data accordingly, and manage the data owned by the entity in a reliable manner.

Also, reproduction of incorrect information may be prevented, and, in the event of a problem, the source of the problem may be identified.

DETAILED DESCRIPTION

Figure 1:
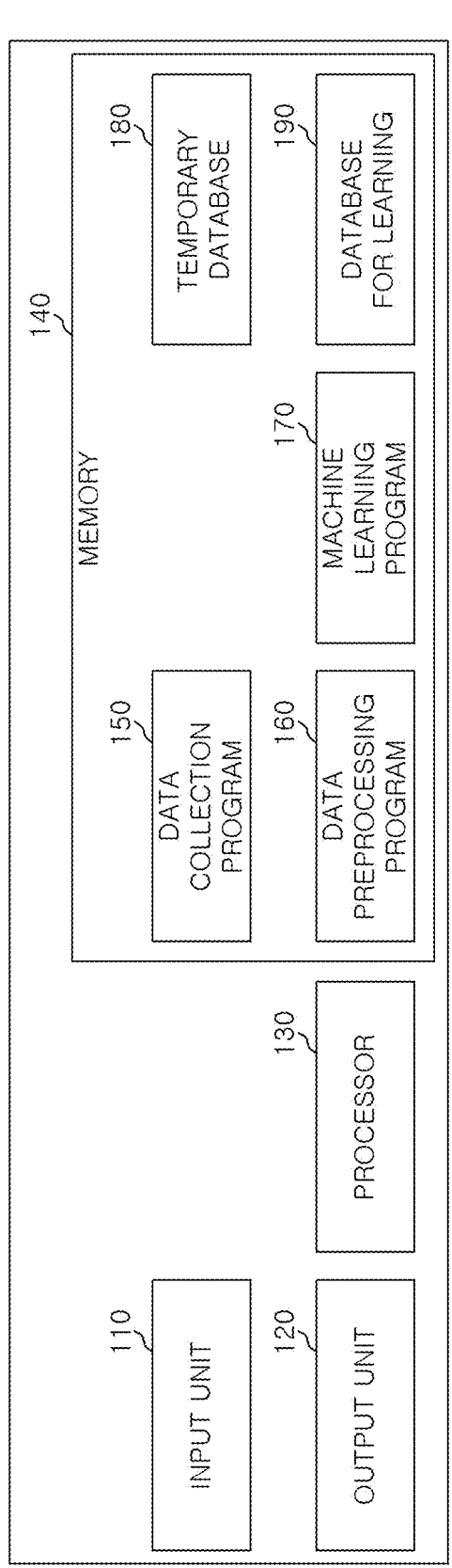
FIG. 1 is a block diagram of a data collection apparatus 100 according to one embodiment of the present disclosure.

In the early days of development, the primarily focus was on research and development rather than commercialization, and there were no notable concerns raised regarding individual rights when data connected to the internet was collected. However, given the rapid pace of technological advances and the widespread adoption of artificial intelligence services, it is necessary to develop methods for protecting personal data, which may contain sensitive information, during the process of data mining.

Even if an artificial intelligence model utilizes information from only one person, the corresponding log record remains. Consequently, the artificial intelligence model may collect and learn the information, potentially leading to its disclosure to unspecified individuals.

In this case, although the initially disclosed information may be provided freely, a problem may arise when the artificial intelligence, developed through learning from the information, discloses conclusions drawn from the information to unspecified individuals without obtaining prior consent from the original information provider. The original information provider may expect compensation commensurate with their status, such as the number of views, citations, and followers of the information. Therefore, even if the information is initially provided for free, the original information provider may be reluctant to provide the information for free to unspecified individuals thereafter.

The same problem persists even when information is provided for a fee. For example, it is common to set different prices based on the number of users of the respective products. Therefore, even if information is paid for and collected, it does not imply that the information may be shared with unspecified individuals. When the information is disclosed to unspecified individuals, it is crucial to consult in advance with a data owner.

Recently, as information collection via networks has become a common task, when specific information is provided, the number of people using that information may be easily determined, and the status of the information provider may change accordingly (e.g., status in academia or impact of a patent).

As another example, if a large amount of potentially problematic information is fed into an artificial intelligence system, the artificial intelligence system learns from the information and provides inferred results based on the learning. Consequently, incorrect information may gain public trust or lead to potential damage.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
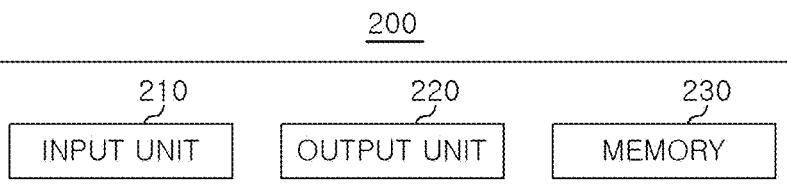
FIG. 2 is an example of a device 200 storing machine learning data according to the present disclosure.
Figure 3:
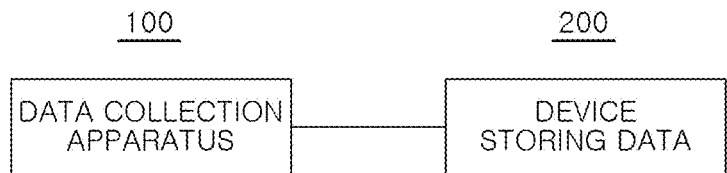
FIG. 3 illustrates a relationship between a data collection apparatus 100 and a device 200 storing machine learning data during a process of collecting the machine learning data according to one embodiment of the present disclosure.

FIG. 1 is a block diagram of a data collection apparatus 100 according to one embodiment of the present disclosure, FIG. 2 is an example of a device 200 storing machine learning data according to the present disclosure, and FIG. 3 illustrates a relationship between a data collection apparatus 100 and a device 200 storing machine learning data during a process of collecting the machine learning data according to one embodiment of the present disclosure. In what follows, the present disclosure will be described in detail with reference to FIGS. 1 to 3.

As shown in FIG. 1, the data collection apparatus 100 may include a processor 130 and a memory 140 and may further include an input unit 110 or an output unit 120.

The input unit 110 may receive machine learning data from the device 200 through a communication network. The communication network may be a wired or wireless network. The input unit 110 may directly receive the machine learning data using an internal device.

The method through which the input unit 110 receives machine learning data is not limited to the embodiment described above.

The output unit 120 may display information including information on machine learning data, data collection status for machine learning, status of machine learning data transmitted to a temporary database 180 or a database for learning 190, information on whether the use of machine learning data has been approved, and information on the status change of approval for using the machine learning data as visual information through an interface or a display means.

The output unit 120 may process information including information on machine learning data, data collection status for machine learning, status of machine learning data transmitted to a temporary database 180 or a database for learning 190, information on whether the use of machine learning data has been approved, and information on the status change of approval for using the machine learning data in the form of data that may be processed in a computer.

The output unit 120 may transmit information including information on machine learning data, data collection status for machine learning, status of machine learning data transmitted to a temporary database 180 or a database for learning 190, information on whether the use of machine learning data has been approved, and information on the status change of approval for using the machine learning data to an external device connected to a communication network.

The information including information on machine learning data, data collection status for machine learning, status of machine learning data transmitted to a temporary database 180 or a database for learning 190, information on whether the use of machine learning data has been approved, and information on the status change of approval for using the machine learning data may be continuously updated and transmitted to an external device by the output unit 120.

The method for the output unit 120 to display information on machine learning data, data collection status for machine learning, status of machine learning data transmitted to a temporary database 180 or a database for learning 190, information on whether the use of machine learning data has been approved, and information on the status change of approval for using the machine learning data may utilize various output formats and is not limited to the embodiment above.

The processor 130 may refer to a data processing device embedded in a hardware component that has a physically structured circuit to perform functions expressed by codes or instructions within a program. The processor 130 may include, but is not limited to, a microprocessor, a central processing unit (CPU), a graphic processing unit (GPU), a processor core, a multiprocessor, and an application-specific integrated circuit (ASIC), and a field programmable gate array (FPGA).

The processor 130 may perform a data collection method for machine learning.

An entity which has generated the machine learning data 200 may refer to the entity related to the device 200 or machine learning data stored in the device 200. For example, the entity which has generated the machine learning data 200 may refer to an owner of the device 200, a right holder whose rights have been approved by the owner of the device 200, or a right holder whose rights have been approved by the owner of machine learning data stored in the device 200. The entity which has generated the machine learning data 200 is not limited to the specific examples above.

Data collection methods for machine learning include, but are not limited to, collection of existing data sets, collection of public repositories, log collection, web scraping, web crawling, and API.

The processor 130 may decode or vectorize accessed machine learning data.

The processor 130 may search the accessed machine learning data for a specific word.

When the processor 130 confirms a specific word searched, the processor 130 may generate new machine learning data and transmit the generated data to the temporary database 180 or the database for learning 190.

The processor 130 may determine the degree of similarity between existing machine learning data and newly generated machine learning data and add the corresponding label to the existing machine learning data or the newly generated machine learning data according to the degree of similarity.

When the processor 130 accesses the machine learning data stored in the device 200, the processor 130 may generate log data.

When the processor 130 accesses the machine learning data, the processor 130 may transmit the machine learning data to the temporary database 180. When the machine learning data is transmitted to the temporary database 180, the machine learning data may be encrypted and transmitted to the temporary database 180.

When the processor 130 accesses the machine learning data stored in the device 200, the processor 130 may search the device 200 or the machine learning data for information on whether the use of the machine learning data has been approved.

If the device 200 or the machine learning data includes disapproval of the use of machine learning data, when the processor 130 accesses the machine learning data, the processor 130 may determine whether to transmit the machine learning data to the temporary database 180.

If the device 200 or the machine learning data includes approval for the use of the machine learning data, the processor 130 may determine whether to transmit the machine learning data to the database for learning 190 without a separate request or approval for the use of machine learning data.

When accessing the machine learning data stored in the device 200, the processor 130 may generate device 200 information, quantitative information of accessible data, relationship information, classification information, scope information, similarity information, and information on the number of accesses, probabilistic information that may be converted into information such as outliers, average points, and variances to be used in the data preprocessing stage, classification codes for machine learning data, classification codes for the device 200, and concentration information; the type of generated information is not limited to the embodiment above.

The processor 130 may transmit information generated during the access of machine learning data to the temporary database 180 or the database for learning 190. The processor 130 may perform data preprocessing for classification of machine learning data. The processor 130 may utilize the information generated during the access of machine learning data to classify the machine learning data.

When approval for the use of machine learning data is inputted, the processor 130 may transmit the machine learning data from the temporary database 180 to the database for learning 190.

If disapproval of the use of machine learning data is inputted, the processor 130 may delete the machine learning data transmitted to the temporary database 180.

If approval for the use of machine learning data is not inputted for more than a predetermined time, the processor 130 may perform control to retransmit an interface for inputting approval for the use of machine learning data for a predetermined number of times. If the interface is retransmitted for more than the predetermined number of times, the processor 130 may delete the machine learning data transmitted to the temporary database 180 without transmitting the machine learning data to the database for learning 190.

Regardless of whether the use of the machine learning data has been approved, the processor 130 may delete the machine learning data transmitted to the temporary database 180.

The processor 130 may store the machine learning data that has been approved for use in the database for learning 190.

The processor 130 may delete the machine learning data transmitted to the database for learning 190.

The machine learning data stored in the device 200 may include other machine learning data additionally generated after approval for the use of machine learning data has been requested. Machine learning data may refer to data consisting of one or more individual data or may refer to a data group consisting of a plurality of data groups. Machine learning data or other additionally generated machine learning data may be modified as their contents are changed.

The processor 130 may transmit modified machine learning data or other additionally generated machine learning data to the database for learning 190 through separate approval for the use of the modified machine learning data or other additionally generated machine learning data. On the contrary, the processor 130 may transmit modified machine learning data or other additionally generated machine learning data to the database for learning 190 without separate approval for the use of the modified machine learning data or other additionally generated machine learning data.

Even after approval for the use of machine learning data has been inputted, approval for the use of machine learning data may be inputted again.

After a first input approving the use of machine learning data is input, if a second input disapproving the use of the machine learning data is inputted again, the processor 130 may not transmit the machine learning data to the database for learning 190 from the moment the second input is re-inputted.

After a third input disapproving the use of machine learning data is input, if a fourth input approving the use of the machine learning data is inputted again, the processor 130 may transmit the machine learning data to the database for learning 190 from the moment the fourth input is re-inputted. Accordingly, when approval for the use of the machine learning data is inputted after the machine learning data transmitted to the temporary database 180 is deleted, the processor 130 may transmit the machine learning data to the database for learning 190.

The memory 140 may store a data collection program 150 and information necessary for execution of the data collection program 150 and may also store processing results by the processor 130. The memory 140 may store a data preprocessing program 160 and information necessary for execution of the data preprocessing program 160. The memory 140 may store a machine learning program 170 and information necessary for execution of the machine learning program 170. The memory 140 may refer to computer-readable recording media, including magnetic media such as hard-disks, floppy disks, and magnetic tapes; optical media such as CD-ROMs and DVDs; magneto-optical media such as floptical disks; and hardware devices specially designed to store and execute program commands such as flash memory; however, the memory 140 is not limited to the embodiment above. Also, the memory 140 may include the temporary database 180 and the database for learning 190.

When the data collection apparatus 100 accesses machine learning data, the machine learning data may be transmitted to the temporary database 180. When machine learning data is transmitted to the temporary database 180, the machine learning data may be encrypted and transmitted to the temporary database 180.

When approval for the use of machine learning data is inputted, the machine learning data may be transmitted from the temporary database 180 to the database for learning 190.

If disapproval of the use of machine learning data is inputted, the machine learning data transmitted to the temporary database 180 may be deleted.

If approval for the use of machine learning data is not inputted for more than a predetermined time, an interface for inputting approval for the use of machine learning data may be retransmitted for a predetermined number of times. If the interface is retransmitted for more than the predetermined number of times, the machine learning data transmitted to the temporary database 180 may be deleted without being transmitted to the database for learning 190.

A predetermined time or a predetermined number of transmissions may be inputted through the input unit 110 of the data collection apparatus 100 or received through the input unit 210 of the device 200 storing machine learning data.

Regardless of whether the use of the machine learning data has been approved, the machine learning data transmitted to the temporary database 180 may be deleted through the data collection apparatus 100.

The machine learning data that has been approved for use may be stored in the database for learning 190. When approval for the use of machine learning data is inputted for the machine learning data transmitted to the temporary database 180, the machine learning data may be transmitted from the temporary database 180 to the database for learning 190. The machine learning data transmitted to the database for learning 190 may be deleted through the data collection apparatus 100. Machine learning may be performed by a machine learning device based on the machine learning data stored in the database for learning 190.

As shown in FIG. 2, the device 200 storing machine learning data may include an input unit 210, an output unit 220, and a memory 230. The device 200 is a place where machine learning data is stored; examples of the device 200 may include a storage medium, a web server, and an apparatus. The recording media may refer to computer-readable recording media, including magnetic media such as hard-disks, floppy disks, and magnetic tapes; optical media such as CD-ROMs and DVDs; magneto-optical media such as floptical disks; and hardware devices specially designed to store and execute program commands such as flash memory. The device 200 storing machine learning data is not limited to the embodiment above.

When the data collection apparatus 100 requests approval for the use of machine learning data, the approval request may be input through the input unit 210. The method for requesting approval may include a method utilizing an alarm or a message but is not limited to the embodiment above.

Whether or not to approve the use of machine learning data may be inputted through the input unit 210. Based on the approval status inputted through the input unit 210, whether to transmit machine learning data to the database for learning 190 may be determined. The approval status inputted through the input unit 210 may be transmitted to the data collection apparatus 100 through a communication network. The communication network may be a wired network or a wireless network.

The output unit 220 may output an interface through which whether to approve the use of machine learning data may be inputted. The output unit 220 may display the interface as visual information through a display means. The output unit 220 may process the interface into data that may be processed by a computer. The output unit 220 may transmit the interface to an external device connected to a communication network. The method for the output unit 220 to output the interface may employ various output forms and is not limited to the embodiment above.

The memory 230 may refer to computer-readable recording media, including magnetic media such as hard-disks, floppy disks, and magnetic tapes; optical media such as CD-ROMs and DVDs; magneto-optical media such as floptical disks; and hardware devices specially designed to store and execute program commands such as flash memory; however, the memory 230 is not limited to the embodiment above.

As shown in FIG. 3, the data collection apparatus 100 may access the machine learning data stored in the device 200 through a communication network. The communication network may be a wired network or a wireless network. The data collection apparatus 100 may directly access the machine learning data stored in the device 200 using an internal device.

The method for the data collection apparatus 100 to access machine learning data stored in the device 200 is not limited to the embodiment above.

Figure 4:
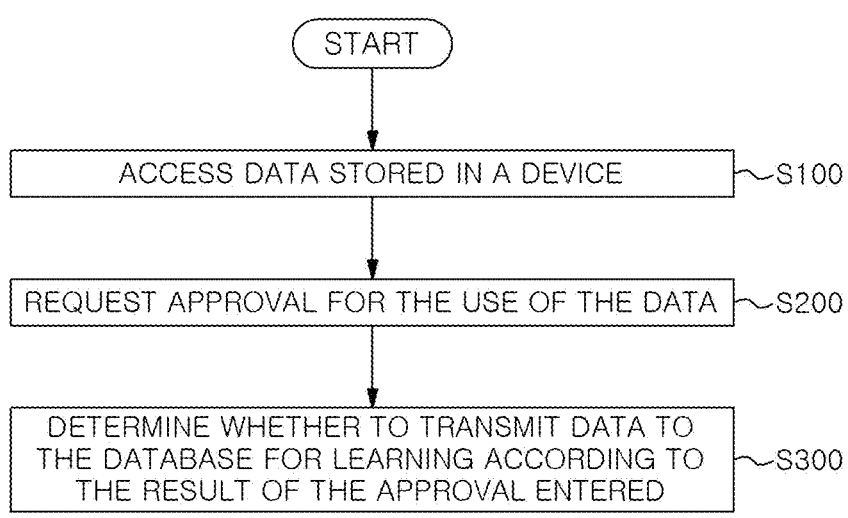
FIG. 4 is a flow diagram illustrating a data collection method for machine learning according to one embodiment of the present disclosure.

FIG. 4 is a flow diagram illustrating a data collection method for machine learning according to one embodiment of the present disclosure.

As shown in FIG. 4, the data collection method for machine learning performed by the data collection apparatus 100 may comprise accessing machine learning data stored in a device S100, requesting approval for the use of the machine learning data from an entity which has generated the machine learning data S200, and determining whether to transmit the machine learning data to the database for learning 190 based on the approval status S300.

Figure 5:
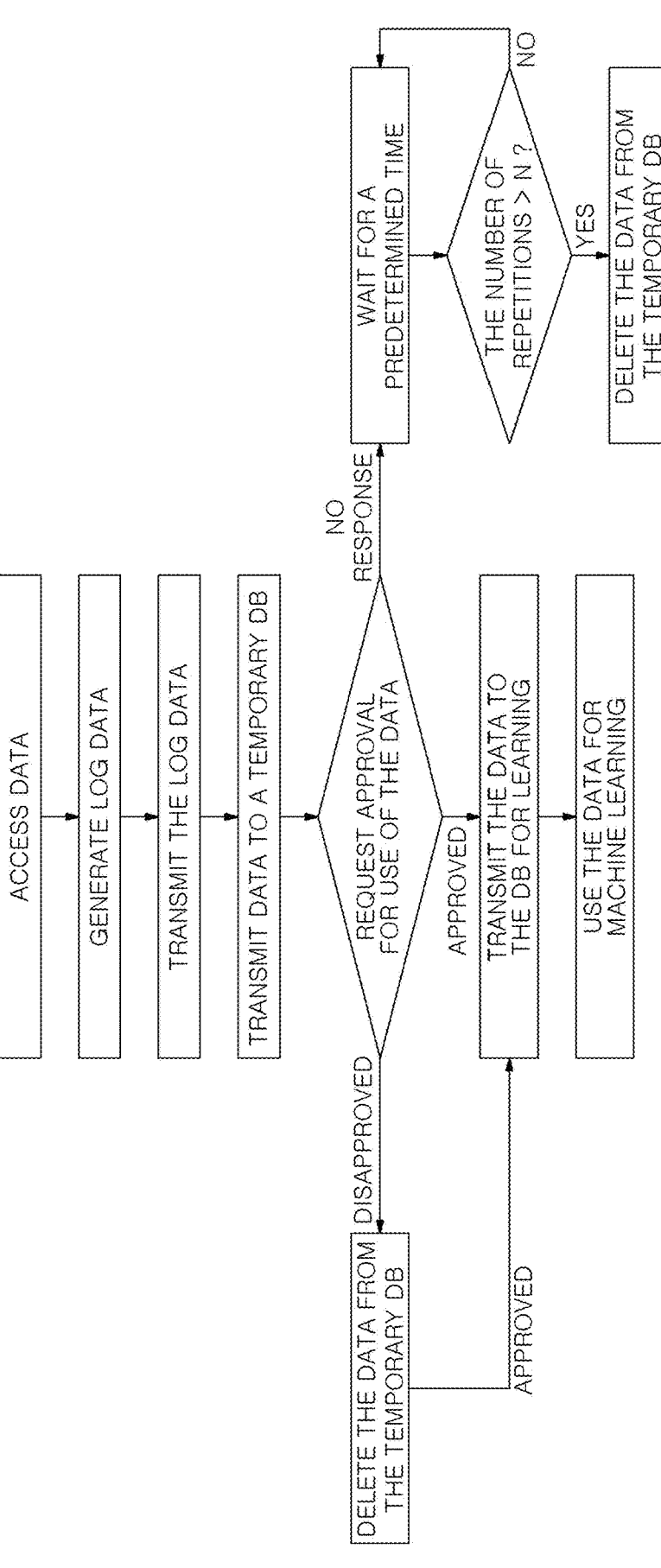
FIG. 5 is a flow diagram specifically illustrating a data collection method for machine learning according to the present disclosure.

FIG. 5 is a flow diagram specifically illustrating a data collection method for machine learning according to the present disclosure.

The data collection apparatus 100 may directly access machine learning data stored in the device 200 using an internal device or access the machine learning data through a communication network.

When the data collection apparatus 100 accesses the machine learning data stored in the device 200, log data may be generated. The generated log data may be stored in the memory 140 of the data collection apparatus 100. The generated log data may be transmitted to an entity which has generated the machine learning data 200. The log data may include the time at which machine learning data has been accessed, an access method, IP information or other unique code, the number of times the machine learning data has been collected, or the number of times machine learning has been performed using the machine learning data. The log data may be generated by collecting a log collected in a server, a web log, a transaction log, a click log, and DB log data. During the process of generating the log data, application data along with data pertaining to logs and resource usage, messages, and events may be organized for collection, indexing, and search purposes. A method for collecting log data is not limited to the embodiment above and may support various collection methods.

When the data collection apparatus 100 accesses machine learning data, the machine learning data may be transmitted to the temporary database 180. When the machine learning data is transmitted to the temporary database 180, the machine learning data may be encrypted and transmitted to the temporary database 180.

Machine learning data may include information on the device 200, which may be used to identify the characteristics of the machine learning data or serve as label information, frequency of use of the machine learning data within and outside the device 200, timestamps for creation and access, and information such as relationship and connection structure between devices and statistical information. The information on the device 200 may be subject to reprocessing.

When the data collection apparatus 100 accesses machine learning data, identity or similarity between the accessed machine learning data and the machine learning data previously transmitted to the temporary database 180 or the database for learning 190 may be determined. Here, identity or similarity may be determined using methods employing cosine similarity, mean squared difference similarity, Euclidean distance, Jaccard coefficient, Pearson correlation coefficient, K-nearest neighbors (KNN), Levenshtein distance, or word embedding such as Word2Vec.

The accessed machine learning data may not be transmitted to the temporary database 180 upon determining that the accessed machine learning data is the same as the machine learning data previously transmitted to the temporary database 180 or the database for learning 190.

In case that the approval for the use of machine learning data previously transmitted to the temporary database 180 is inputted, a decision as to whether to transmit the machine learning data to the database for learning 190 may be made without involving a separate request or approval for the use of the machine learning data upon determining that the machine learning data determined to have a high degree of similarity to machine learning data previously transmitted to the temporary database 180.

A decision as to whether to transmit the machine learning data to the database for learning 190 may be made without involving a separate request or approval for the use of the machine learning data upon determining that the machine learning data determined to have a high degree of similarity to machine learning data previously transmitted to the database for learning 190.

A method for classifying machine learning data identical or similar to machine learning data previously transmitted to the temporary database 180 may use not only the collected machine learning data but also the information generated during the access of the machine learning data. The information generated during the access of machine learning data may be transmitted to the database for learning 190 without requiring approval for the use of the machine learning data. The generated information may include various types of data that may be accessed and generated, such as data classification, information on the source of the device 200, a connection structure identified from a relationship between devices, and similarity of terms used; through machine learning, which may be used as a data preprocessing technique without exposing the original data, methodologies such as dimensionality reduction, clustering, and grouping manifold and data preprocessing techniques that include state-of-the-art methods may be implemented.

Through the analysis above, it is possible to distinguish machine learning data to be transmitted to the temporary database 180, machine learning data to be transmitted to the database for learning 190, and machine learning datasets for which approval for use is to be requested.

If disapproval of the use of machine learning data is included in the device 200 or the machine learning data, and the machine learning data is accessed, a decision as to whether to transmit the machine learning data to the temporary database 180 may be made. If approval for the use of machine learning data is included in the device 200 or the machine learning data, a decision as to whether to transmit the machine learning data to the database for learning 190 may be made without involving separate request or approval for the use of the machine learning data.

When approval for the use of machine learning data is inputted, the machine learning data may be transmitted from the temporary database 180 to the database for learning 190. Other machine learning data determined as having a high similarity or being identical to the machine learning data for which approval for use has been inputted may be transmitted to the database for learning 190. At this time, the transmission may include quantitative information of other machine learning data determined as having a high similarity or being identical to the machine learning data for which approval for use has been inputted.

If disapproval of the use of machine learning data is inputted, the machine learning data transmitted to the temporary database 180 may be deleted. In this case, only a portion of other machine learning data determined as having a high similarity or being identical to the machine learning data transmitted to the temporary database 180 may be deleted.

If approval for the use of machine learning data is not inputted for more than a predetermined time, an interface for inputting approval for the use of machine learning data for a predetermined number of times may be retransmitted. If the interface is retransmitted for more than the predetermined number of times, the machine learning data transmitted to the temporary database 180 may be deleted without transmitting the machine learning data to the database for learning 190. In this case, only a portion of other machine learning data determined as having a high similarity or being identical to the machine learning data transmitted to the temporary database 180 may be deleted.

A predetermined time or a predetermined number of transmissions may be inputted through the input unit 110 of the data collection apparatus 100 or received through the input unit 210 of the device 200 storing machine learning data.

Regardless of whether the use of the machine learning data has been approved, the machine learning data transmitted to the temporary database 180 may be deleted through the data collection apparatus 100.

The machine learning data that has been approved for use or information generated for machine learning may be stored in the database for learning 190.

When approval for the use of machine learning data is inputted for the machine learning data transmitted to the temporary database 180, the machine learning data or information generated for machine learning may be transmitted from the temporary database 180 to the database for learning 190. The machine learning data transmitted to the database for learning 190 may be deleted through the data collection apparatus 100. Machine learning may be performed by a machine learning device based on the machine learning data stored in the database for learning 190.

The machine learning data stored in the device 200 may include other machine learning data additionally generated after approval for the use of machine learning data has been requested. Machine learning data may refer to data consisting of one or more individual data or may refer to a data group consisting of a plurality of data groups. Machine learning data or other additionally generated machine learning data may be modified as their contents are changed.

The modified machine learning data or other additionally generated machine learning data may be transmitted to the database for learning 190 through separate approval for the use of the modified machine learning data or other additionally generated machine learning data. On the contrary, the modified machine learning data or other additionally generated machine learning data may be transmitted to the database for learning 190 without separate approval for the use of the modified machine learning data or other additionally generated machine learning data.

Even after approval for the use of machine learning data has been inputted, approval for the use of machine learning data may be inputted again.

After a first input approving the use of machine learning data is input, if a second input disapproving the use of the machine learning data is inputted again, the machine learning data may not be transmitted to the database for learning 190 from the moment the second input is re-inputted.

After a third input disapproving the use of machine learning data is input, if a fourth input approving the use of the machine learning data is inputted again, the machine learning data may be transmitted to the database for learning 190 from the moment the fourth input is re-inputted. Accordingly, when approval for the use of the machine learning data is inputted after the machine learning data transmitted to the temporary database 180 is deleted, the machine learning data may be transmitted to the database for learning 190.

Machine learning may be performed by a machine learning device based on the machine learning data stored in the database for learning 190.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable storage medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A computer-implemented data collection method for machine learning to be performed by a data collection apparatus including a processor and a memory storing instructions executable by the processor, the method comprising:

accessing machine learning data stored in a device including a storage medium;

in response to the accessing, generating log data including at least a time at which the machine learning data is accessed and an access method, and transmitting the log data to an entity that generated the machine learning data;

determining a similarity between the machine learning data and previously-transmitted-machine learning data, wherein the previously-transmitted-machine learning data includes a first machine learning data that has been previously transmitted to a database for learning and a second machine learning data that has been previously transmitted to a temporary database, wherein there is at least one similarity that is greater than or equal to a first predetermined value, at least one similarity that is less than or equal to a second predetermined value, and at least one similarity that indicates identical data;

in response to the similarity indicating identical data between the machine learning data and at least part of the first machine learning data or the second machine learning data, not transmitting the machine learning data;

in response to the similarity between the machine learning data and at least part of the second machine learning data being greater than or equal to the first predetermined value, and a previously received second approval for the use of the second machine learning data being inputted, directly transmitting the machine learning data to the database for learning without requesting approval for the use of the machine-learning data;

in response to the similarity between the machine-learning data and at least part of the first machine-learning data being greater than or equal to the first predetermined value, directly transmitting the machine-learning data to the database for learning without requesting approval for the use of the machine-learning data;

in response to the similarity between the machine learning data and at least part of the first machine learning data or the second machine learning data being less than the second predetermined value, transmitting the machine learning data to the temporary database;

requesting an approval for a use of the machine learning data from the entity that generated the machine learning data and receiving an approval response comprising an approval input or a disapproval input;

in response to the similarity between the machine learning data and at least part of the first machine learning data or the second machine learning data being less than the second predetermined value and the approval input being received, transmitting the machine learning data from the temporary database to the database for learning;

in response to the disapproval input being received, storing the machine-learning data in the temporary database;

modifying contents of the machine learning data;

in response to the contents of the machine learning data being modified, directly transmitting the modified contents of the machine learning data to the database for learning without requesting separate approval for the use of the machine learning data; and performing machine learning using the machine learning data stored in the database for learning.

2. The method of claim 1, wherein the device includes a non-transitory storage medium.

3. The method of claim 1, wherein transmitting the machine learning data to the temporary database comprises encrypting the machine learning data and transmitting the encrypted machine learning data to the temporary database.

4. A data collection apparatus comprising:

a memory including computer-executable instructions; and a processor configured to execute the computer-executable instructions to:

access machine learning data stored in a device including a storage medium;

in response to the accessing, generate log data including at least a time at which the machine learning data is accessed and an access method, and transmit the log data to an entity that generated the machine learning data;

determine a similarity between the machine learning data and previously-transmitted-machine learning data, wherein the previously-transmitted-machine learning data includes a first machine learning data that has been previously transmitted to a database for learning and a second machine learning data that has been previously transmitted to a temporary database, wherein the similarity is greater than or equal to a first predetermined value, less than or equal to a second predetermined value, or indicates identical data;

in response to the similarity indicating identical data between the machine learning data and at least part of the first machine learning data or the second machine learning data, not transmit the machine learning data;

in response to the similarity between the machine learning data and at least part of the second machine learning data being greater than or equal to the first predetermined value, and a previously received second approval for the use of the second machine learning data being inputted, directly transmit the machine learning data to the database for learning without requesting approval for the use of the machine-learning data;

in response to the similarity between the machine-learning data and at least part of the first machine-learning data being greater than or equal to the first predetermined value, directly transmit the machine-learning data to the database for learning without requesting approval for the use of the machine-learning data;

in response to the similarity between the machine learning data and at least part of the first machine learning data or the second machine learning data being less than the second predetermined value, transmit the machine learning data to the temporary database;

request an approval for a use of the machine learning data from the entity that generated the machine learning data and receiving an approval response comprising an approval input or a disapproval input;

in response to the similarity between the machine learning data and at least part of the first machine learning data or the second machine learning data being less than the second predetermined value and the approval input being received, transmit the machine learning data from the temporary database to the database for learning;

in response to the disapproval input being received, store the machine-learning data in the temporary database;

modify contents of the machine learning data;

in response to the contents of the machine learning data being modified, directly transmit the modified contents of the machine learning data to the database for learning without requesting separate approval for the use of the machine learning data; and perform machine learning using the machine learning data stored in the database for learning.

5. A non-transitory computer-readable storage medium storing computer-executable instructions, when executed by one or more processors, that cause the one or more processors to perform the method of claim 1.

* * * * *